United States Patent [19]

Suzuki et al.

[11] Patent Number: 5,165,088
[45] Date of Patent: Nov. 17, 1992

[54] OPTICAL PICKUP WITH BILATERAL AND VERTICAL SYMMETRY

[75] Inventors: Jun Suzuki; Toshihiko Kurihara, both of Saitama, Japan

[73] Assignee: Pioneer Electronic Corporation, Tokyo, Japan

[21] Appl. No.: 472,540

[22] Filed: Jan. 30, 1990

[30] Foreign Application Priority Data

May 9, 1989 [JP] Japan ................ 1-52591[U]

[51] Int. Cl.⁵ .............................................. G11B 7/00
[52] U.S. Cl. ................................. 369/44.14; 359/813
[58] Field of Search ............... 369/44.15, 44.16, 44.21, 369/44.22, 44.14, 244, 44.11; 359/813, 814, 824

[56] References Cited

U.S. PATENT DOCUMENTS

| | | | |
|---|---|---|---|
| 4,613,202 | 9/1986 | Kuriyama | 369/44.15 |
| 4,766,583 | 8/1988 | Oinoue et al. | 369/44.16 |
| 4,766,584 | 8/1988 | Sekimoto et al. | 369/44.15 |
| 4,792,935 | 12/1988 | Kime et al. | 369/44.22 |
| 4,998,802 | 3/1991 | Kasuga et al. | 369/44.22 |

Primary Examiner—Aristotelis Psitos
Assistant Examiner—Nabil Hindi
Attorney, Agent, or Firm—Sughrue, Mion, Zinn, Macpeak & Seas

[57] ABSTRACT

A pair of driving coils each having a focusing coil and a driving coil are arranged such that the focusing coils, and the tracking coils, of each of the driving coils are attached on opposite side surfaces of an optical-parts holder in a manner so that the focusing coils, and tracking coils, are symmetrically disposed both bilaterally and vertically with respect to the center of gravity of the optical-parts holder.

2 Claims, 3 Drawing Sheets

OPTICAL PICKUP WITH BILATERAL AND VERTICAL SYMMETRY

FIELD OF THE INVENTION

The present invention relates to an improvement of an optical pickup for reading a signal on an optical disk, such as an audio disk in the form of a compact disk or a video disk in the form of a laser disk, having information which has been recorded optically.

BACKGROUND OF THE INVENTION

FIG. 6 shows a conventional drive device for driving an objective lens to preform the focusing servo and tracking servo operations. This conventional drive device is disclosed in U.S. Pat. No. 4,861,138.

A magnetic flux designated by reference numeral 6 is produced in the drive device of the above construction, and when electric current is supplied to the tracking coil 3, an electromagnetic force is exerted in the direction of the arrow T on those two portions of the tracking coil 3 facing the north pole and south pole surfaces, respectively. The objective lens 1 is driven, together with the holder member 2, by this electromagnetic force to thereby effect the tracking servo.

In the above drive in which a magnetic flux is produced between the two pole surfaces of opposite polarity disposed adjacent each other in a plane, the magnetic circuit is very thin, and therefore the overall construction of the device can be compact. However, the drive device requires a large and relatively expensive magnet, and therefore the overall cost is high. The magnet of such a construction is produced by magnetizing a flat plate of magnetic material using a magnetizer having two pole surfaces and cannot be perfectly magnetized in the vicinity of the boundary therebetween. To compensate for this, the magnet must be increased in size. This increases the size of the tracking coil, and offers (a problem to be solved in) an obstacle to achieving a compact overall construction of the device.

SUMMARY OF THE INVENTION

It is an object of the present invention to provide an optical pickup in which the problems in the optical pickup described above can be solved, and in which the optical-parts holder can be reduced in vertical size thereby to reduce the size of the optical pickup.

In order to attain the above object, the optical pickup according to the present invention includes a pair of driving coils disposed within magnetic circuits and each including a focusing coil and a tracking coil for driving an optical-parts holder having at least an objective attached thereon. The driving coils are attached to opposite side surfaces of the optical-parts holder in a manner so that the pair of driving coils are symmetrical with respect to the center of gravity, not only bilaterally but also vertically.

DETAILED DESCRIPTION OF THE PREFERRED EMBODIMENT

Figure 3:
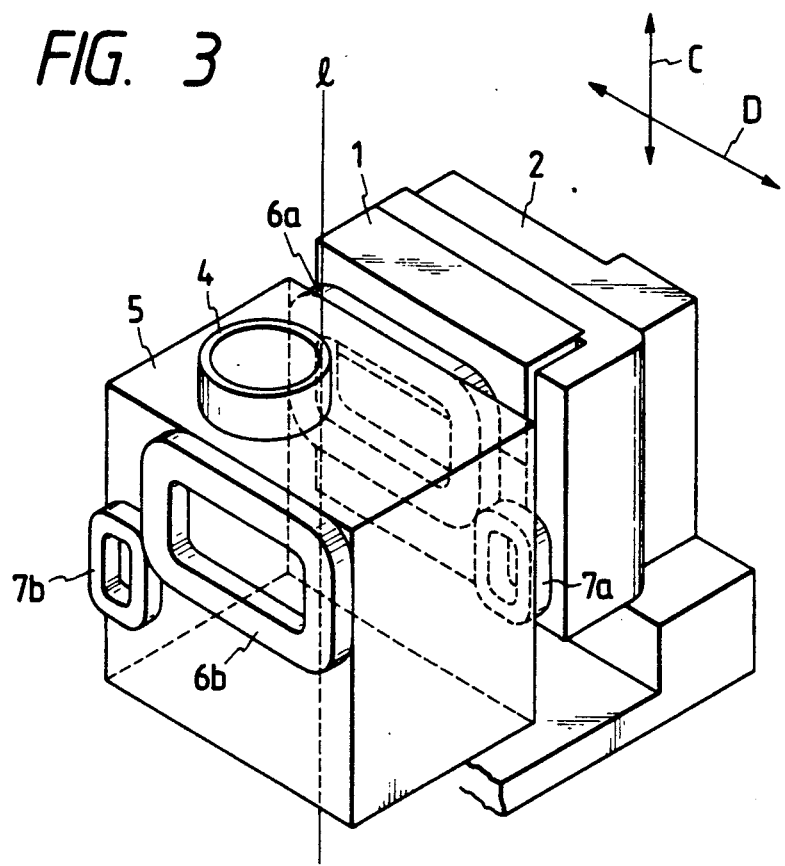
FIG. 3 is a perspective view of a relevant optical pickup.
Figure 4:
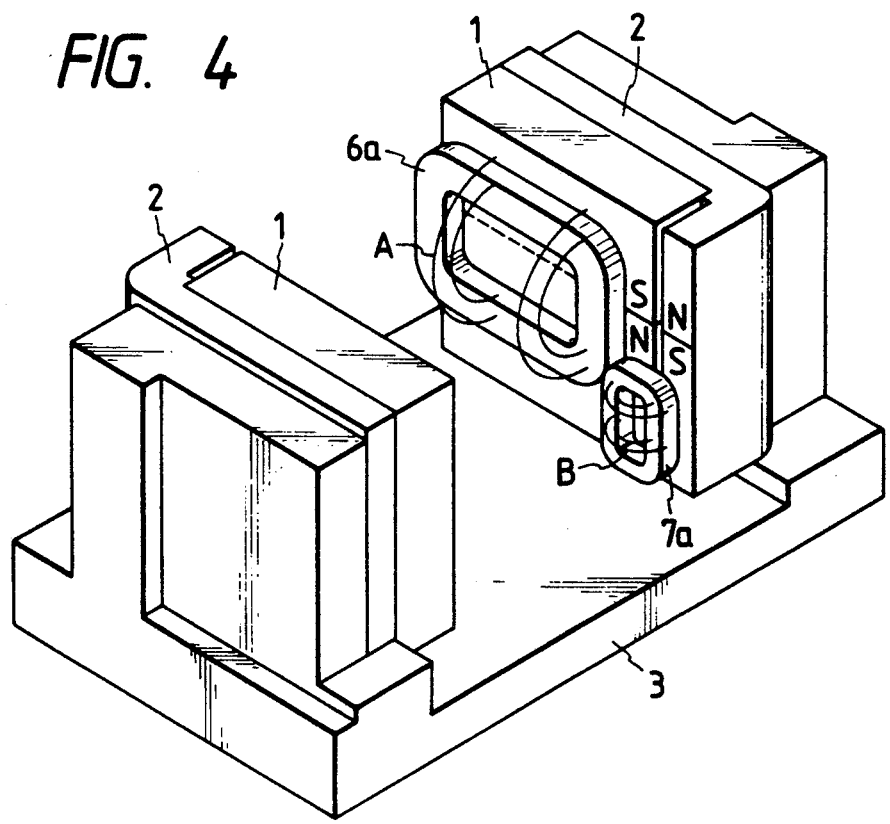
FIG. 4 is a perspective view of a magnetic circuit portion of the relevant optical pickup of FIG. 3.
Figure 5:
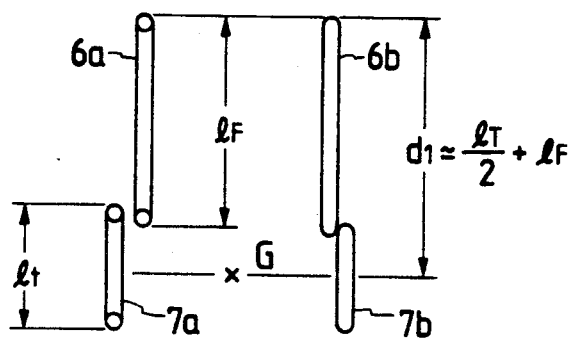
FIG. 5 is a side view showing the arrangement of FIG. 3 with respect to the center of gravity.
Figure 6:
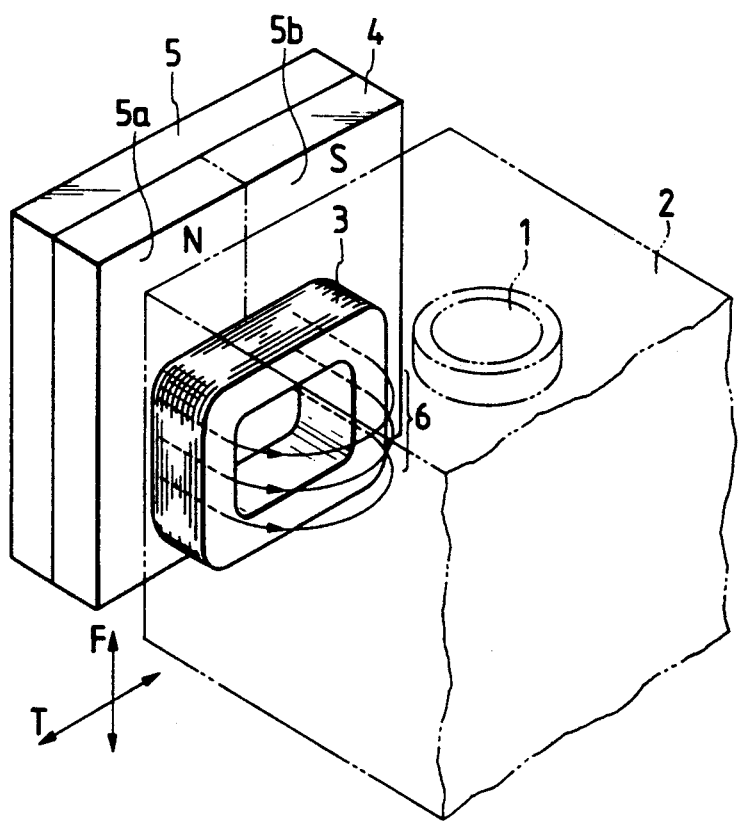
FIG. 6 is a perspective view of a conventional optical component-driving device.

U.S. patent application Ser. No. 374,803 (the same inventorship and assignee as those of the present application.) which is herein incorporated by reference and which is relevant to the present invention has proposed an optical pickup in which focusing coils and tracking coils are provided on bilaterally opposite side surfaces of an optical-parts holder on which an objective lens is attached. FIGS. 3 and 4 show the optical pickup, and FIG. 5 shows the positional relation of focusing coils and the tracking coils with respect to the center of gravity G.

The optical pickup is provided with two symmetrical magnetic circuits.

As shown in FIG. 4, each of the magnetic circuits is constituted by a magnet 1 and an L-shaped yoke 2, each of which is magnetized to have two poles. The yoke 2 is stuck or attached on the back surface of the magnet 1 so that one end surface of the yoke 2 is even with the front surface of the magnet 1.

In the magnetic circuit, therefore, leakage flux A is generated between the two poles on the front surface of the magnet 1, and leakage flux B is generated between the magnet 1 and the yoke 2.

A pair of such magnetic circuits are attached on fixing plate 3 so that the magnets 1 are bilaterally opposite and opposed to each other, and so that the respective gaps each between the magnet 1 and the yoke 2 are disposed on bilaterally opposite sides to each other.

A driving coil pair constituted of a focusing coil 6a and a tracking coil 7a and another driving coil pair of constituted a focusing coil 6b and a tracking coil 7b are attached on the respective laterally opposite side surfaces of an elastically supported holder 5, on which an optical system including an objective 4, a light source, a light receiving element, etc. is attached. The focusing coils 6a and 6b are provided so as to intersect the leakage flux A, and the tracking coils 7a and 7b are provided so as to intersect the leakage flux B.

Accordingly, the set of the focusing coil 6a and the tracking coil 7a and the set of the focusing coil 6b and the tracking coil 7b are disposed so as to be bilaterally symmetrical with each other respectively, that is, the two sets of the magnetic circuits and those coils are provided symmetrically with each other, with respect to a center line l of the holder 5.

In such a configuration, when an electric current flows in the focusing coils 6a and 6b, the holder 5 is driven in the direction shown by an arrow C (FIG. 3), while when an electric current flows in the tracking coils 7a and 7b, the holder 5 is driven in the direction shown by an arrow D, so that focusing and tracking are performed with respect to a disk and a signal train, respectively.

An embodiment of the present invention to be described hereinbelow provides certain advantages over the foregoing structure, giving attention to the following characteristics of the structure described above.

In such an optical pickup, it is necessary to make the central point of gravity G of the holder 5 and the point of force application with respect to the holder 5 coincide with each other, otherwise the tracking coils 7a and 7b generate component forces which would make the optical axis of the optical pickup incline.

Since the focusing coils 6a and 6b are disposed above the tracking coils 7a and 7b, respectively, and thus add mass to an upper portion of the holder 5 as shown in FIG. 5, the portion of holder body below the tracking coils 7a and 7b must necessarily be large to offset the same and insure that the central point of gravity of the holder 5 coincides with the point of force application and thus the holder 5 becomes long. Accordingly, there is a disadvantage that the optical pickup becomes long in vertical size.

The embodiment of the present invention includes a pair of driving coils disposed within magnetic circuits and each including a focusing coil and a tracking coil for driving an optical-parts holder having at least an objective attached thereon, with the driving coils being attached on opposite side surfaces of the optical-parts holder in a manner so that the pair of driving coils are symmetrical with respect to the center of gravity, not only bilaterally but also vertically.

Figure 1:
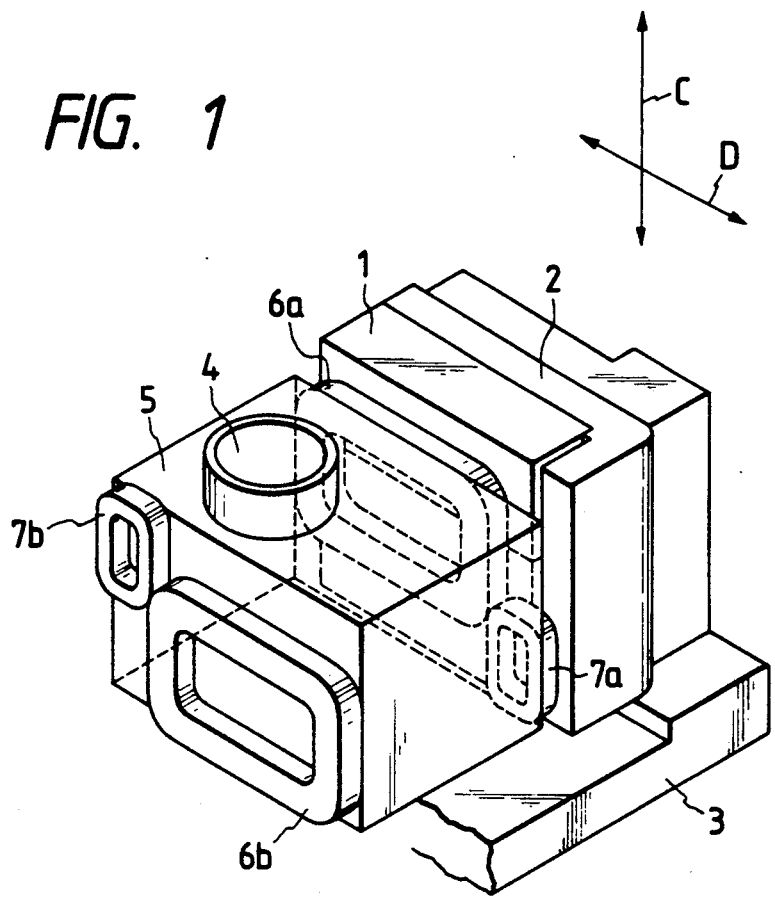
FIG. 1 is a perspective view of an embodiment of the optical pickup according to the present invention.

Referring to FIG. 1, an embodiment of the optical pickup according to the present invention will be described hereunder. In the drawing, parts being similar to, or the same as, those in FIGS. 3 through 5 are given corresponding reference characters.

In FIG. 4, with respect to the leakage magnetic flux generated between the magent 1 and the yoke 2, leakage magnetic flux is generated also between the S pole of the upper magnet 1 and the N pole of the upper yoke 2 so that this upper leakage magnetic flux (not shown) is opposite in direction to the lower leakage magnetic flux B.

The present invention makes full use of this leakage flux, with one tracking coil 7b being displaced upward, and one focusing coil 6b being displaced downward correspondingly. According to such arrangement, the focusing coil 6b and the tracking coil 7b are disposed so as to be vertically symmetrical with the focusing coil 6a and the tracking coil 7a respectively with respect to the center of gravity G.

The conventional optical pickup described above is symmetrical only with respect to the central line l, that is, axial symmetrical. The pickup according to the present invention is, however, symmetrical also vertically, that is, point symmetrical with respect to the center of gravity G.

Figure 2:
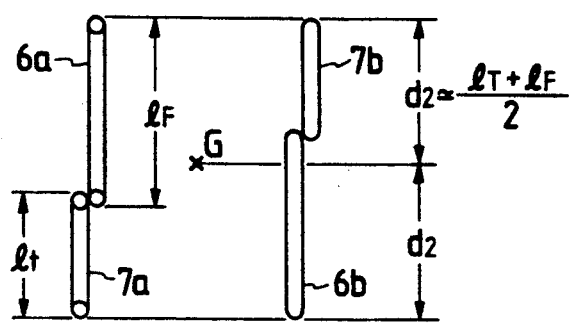
FIG. 2 is a side view showing the arrangement of FIG. 1 with respect to the center of gravity.

In such configuration, let the vertical length of each of the focusing coils 6a and 6b be $l_F$ and let the vertical length of each of the tracking coils 7a and 7b be $l_T$ as shown in FIG. 2, then each of the upper and lower lengths $d_2$ from the center of gravity to the top or bottom of the holder 5 is expressed as follows.

$$d_2 = \frac{l_F + l_T}{2}$$

On the other hand, in the case of FIG. 5, the length $d_1$ from the center of gravity G in the one direction is as follows.

$$d_1 = \frac{l_T}{2} + l_F$$

Thus, in the embodiment of the present invention, the vertical length of the holder 5 can be shortened by $l_F$ in comparison to the aforementioned conventional approach.

Since the tracking coils 7a and 7b are vertically symmetrical with each other, the point of force application thereof passes through the center of gravity G. Accordingly, no component force which would make the holder 2 incline is generated.

Although each of the pair of focusing coils 6a and 6b and the pair of tracking coils 7a and 7b is disposed in point symmetry in the embodiment, the same operation and effect can be obtained even in the case where only either pair of the coils (i.e., tracking or focusing) is disposed in point symmetry.

As described above, according to the present invention, the pair of focusing coils and/or the pair of tracking coils are disposed on the optical-parts holder so as to be point symmetrical with respect to the center of gravity, not only bilaterally but vertically, so that those coils are never provided on the same side with respect to the center of gravity, and the total height of the optical-parts holder can be reduced.

Accordingly, the optical pickup can be reduced in size as well as in weight.

Further, since the points of force application by the pair of focusing coils and the pair of tracking coils are made vertically symmetrical with each other with respect to the center of gravity, the forces of those coils pass through the center of gravity so as not to cause the optical-parts holder to incline.

What is claimed is:

1. An optical pickup comprising:
a pair of driving coil devices disposed within magnetic circuits so as to drive an optical-parts holder having at least an objective lens attached thereon, each of said driving coil devices being attached on opposite side surfaces of said optical parts holder in a manner so that said pair of driving coil devices are disposed so as to exhibit point to point symmetry with respect to the center of gravity of said optical-parts holder said driving devices being offset from one another along a first axis which is parallel to an optical axis of said objective lens and a second axis which is perpendicular to said optical axis.

2. A pickup means as claimed in claim 1, wherein each of said driving coil devices comprises a focusing coil and a tracking coil with the focusing coil, and the tracking coil associated with each of said driving coil devices being attached on opposite side surfaces of said optical-parts holder in a manner so that said focusing coil, and tracking coil, of said pair of driving coil devices are disposed so as to exhibit point to point symmetry with respect to the center of gravity of said optical-parts holder means.

* * * * *